United States Patent [19]
Schubert

[11] Patent Number: 5,938,561
[45] Date of Patent: Aug. 17, 1999

[54] CONTROL SYSTEM DEPENDENT ON AN ERROR IN THE ENGINE CONTROL SYSTEM

[75] Inventor: Peter Schubert, Leingarten, Germany

[73] Assignee: Robert Bosch GmbH, Stuttgart, Germany

[21] Appl. No.: 08/875,383

[22] PCT Filed: Jul. 23, 1996

[86] PCT No.: PCT/DE96/01346

§ 371 Date: Jul. 25, 1997

§ 102(e) Date: Jul. 25, 1997

[87] PCT Pub. No.: WO97/19828

PCT Pub. Date: Jun. 5, 1997

[30] Foreign Application Priority Data

Nov. 25, 1995 [DE] Germany .......................... 195 44 021

[51] Int. Cl.⁶ ................................................. B60K 41/24
[52] U.S. Cl. ........................... 477/79; 477/174; 477/906; 477/181
[58] Field of Search ............... 477/79, 77, 906, 477/174, 181, 168

[56] References Cited

U.S. PATENT DOCUMENTS

| | | |
|---|---|---|
| 4,515,125 | 5/1985 | Buck . |
| 4,677,880 | 7/1987 | Hattori et al. .......................... 477/77 |
| 5,103,691 | 4/1992 | Shimanaka et al. ................. 477/906 X |
| 5,216,938 | 6/1993 | Yamaguchi ......................... 477/906 X |
| 5,243,527 | 9/1993 | Kroger ................................ 477/906 X |
| 5,316,116 | 5/1994 | Slicker et al. ........................... 477/181 |
| 5,505,671 | 4/1996 | Streib et al. ............................. 477/115 |
| 5,527,238 | 6/1996 | Hrovat et al. ....................... 477/181 X |
| 5,615,656 | 4/1997 | Mathis .................................... 123/447 |
| 5,722,912 | 3/1998 | Narita ................................. 477/174 X |
| 5,778,330 | 7/1998 | McKee ................................ 477/906 X |

FOREIGN PATENT DOCUMENTS

| | | |
|---|---|---|
| 0474107 | 3/1992 | European Pat. Off. . |
| 2632905 | 12/1989 | France . |
| 63-222931 | 9/1989 | Japan . |

*Primary Examiner*—Dirk Wright
*Assistant Examiner*—Peter T. Kwon
*Attorney, Agent, or Firm*—Walter Ottesen

[57] ABSTRACT

A device for controlling a driving force which is mounted between a vehicle motor and the wheels of a motor vehicle controls at least to reduce the force flow between the vehicle motor and the wheels in response to a drive signal. The vehicle motor is controlled by the device of a motor control. The drive signal is formed in dependence upon a detected fault in the motor control. The force flow between the vehicle motor and the wheels is especially then interrupted when an emergency shutoff of the motor can cause a high drag torque on the wheels and therefore a driving situation critical with respect to safety. The device for controlling the driving force is comprising a clutch downstream of the motor, an automatic or automated transmission, and a converter bridge clutch which can bridge the torque converter downstream of the vehicle motor.

6 Claims, 1 Drawing Sheet

5,938,561

CONTROL SYSTEM DEPENDENT ON AN ERROR IN THE ENGINE CONTROL SYSTEM

BACKGROUND OF THE INVENTION

Such automatic clutches or servo clutches are, for example, known from the text entitled "Kraftfahrtechnisches Taschenbuch", 1991 Edition, pages 538 and 539, or German patent application P 195 40 921. Servo clutches offer, in combination with electronic control apparatus, either an automated start from standstill or, together with servo-actuated shifting mechanisms, a fully automatic transmission. In such servo clutches, the disengagement and engagement of the clutch is generally actuated via a servo drive.

In addition to such servo clutches, automatic transmissions are known wherein the transmission ratios can be changed in response to a drive signal. Especially, the neutral position of the automatic transmission can be set in response to a drive signal to interrupt the force flow between the vehicle motor and the wheels. Likewise, in the case of an above-mentioned automated manual transmission, the force flow between the vehicle motor and the wheels can be interrupted by a controlled setting of the neutral position.

Such automatic transmissions can be connected via a hydraulic converter to the vehicle motor in a manner known per se. The converter can be bridged via a known converter bridge clutch in response to a drive signal or the bridge can be interrupted.

Furthermore, it is known to provide a motor control apparatus for controlling a vehicle motor. With the motor control apparatus, open-loop control or closed-loop control can be provided, for example, in dependence upon driver command, motor operating parameters and additional variables representing or influencing the operation of the vehicle. These variables can especially be the metering of fuel. In such motor controls, and for specific malfunctions, it is conventional to decrease the motor power via an emergency switchoff in a relatively short time, that is, abruptly.

A safety shutoff valve can, for example, be provided for a diesel engine so that, in the case of a fault, a safety switchoff is guaranteed. Such a safety switchoff valve is identified as ELAB for diesel engines.

German patent application 195 35 418.4 discloses that, for specific diesel injection systems such as the so-called common-rail systems, the use of such a safety shutoff valve is problematic because a large volume of fuel, which is under high pressure, is present between the safety valve and the injection nozzles. Accordingly, after actuation of the shutoff valve, the engine continues to run for a specific time or, in the case of a leak, a considerable quantity of fuel escapes under high pressure. In this application, a way is shown to reduce the engine power even more rapidly in the case of a fault.

SUMMARY OF THE INVENTION

The invention has as its object, in the case of a detected fault, to ensure a high degree of driving safety.

The invention proceeds from a system for controlling means which are arranged between the vehicle engine and the wheels of the vehicle and by means of which the force flow between the vehicle engine and the wheels can at least be reduced in response to a drive signal. The vehicle engine is open-looped controlled or closed-looped controlled by means of a motor control. The essence of the invention is that the mentioned drive signal is formed in dependence upon a detected fault in the motor control.

As means in the sense of the invention, especially the following is provided: a clutch downstream of the engine, an automatic transmission or automated transmission and/or a converter bridge clutch which can bridge a torque converter downstream of the vehicle engine.

The invention affords the advantage that, for a detected fault in the motor control, the force flow between engine and wheels can be reduced. In this way, it is achieved that the driving performance of the vehicle does not change too abruptly. A change of driving performance critical to safety can then be expected when the detected fault, directly or indirectly, causes a change of the torque of the vehicle engine. Here, especially a change of the torque in the sense of a reduction is meant. If this change takes place in a relatively short time, that is abruptly, then the drag torque of the engine caused thereby can lead to very safety-critical driving situations including a blocking of the drive wheels.

The reduction of the engine power or of the engine torque can take place in that, in reaction to the detected fault, at least a reduction, in general however, a complete cutoff of the metered fuel of the vehicle engine is effected.

Preferably, the force flow between the vehicle engine and the wheels can be completely interrupted for such a fault.

It can be provided that the vehicle engine is a diesel engine wherein the fuel is pumped by a pump into a high pressure part and the metering of fuel into the individual cylinders is controllable by means of magnetic valves. For a detected fault, the torque of the engine is then abruptly reduced.

In the case of the configuration of the means as a clutch mounted downstream of the engine, it can be provided that the clutch is disengaged at least partially but especially completely in response to the drive signal. In the case of the configuration as an automatic transmission or automated transmission, the transmission can be set into its neutral position in response to the drive signal; whereas, in the case of the configuration of the means as a converter bridge clutch, this clutch can at least be partially and especially even completely opened in response to the drive signal.

Additional advantageous embodiments are provided in the dependent claims.

DESCRIPTION OF THE PREFERRED EMBODIMENTS OF THE INVENTION

Figure 1:
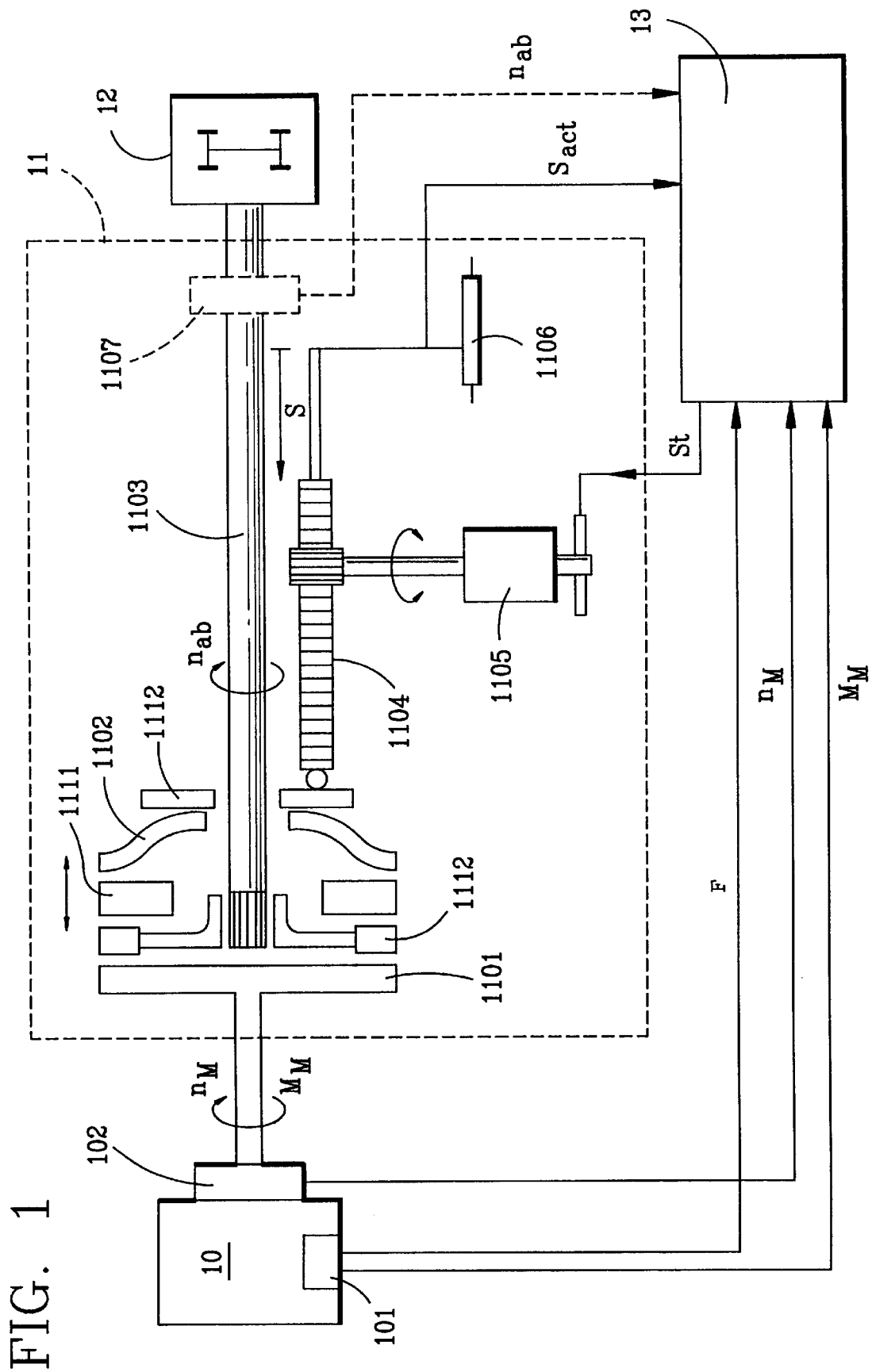
FIG. 1 shows the system of the invention with respect to a block circuit diagram.

The invention will be explained with respect to the example of a servo clutch with respect to the embodiments described below.

FIG. 1 shows, as an example, a servo clutch. Reference numeral 10 identifies a vehicle engine. The output shaft of the vehicle engine is connected to the flywheel 1101 of the servo clutch 11. The operation of the engine 10 is controlled by the motor control apparatus 101 for which the motor apparatus 101 is supplied with operating data of the motor. At the output end, the servo clutch 11 leads via a transmission to the wheels which are sketched with block 12. The clutch control unit 13 is supplied with the engine rpm $n_M$ and the engine torque $M_M$. The actual engaging path $S_{act}$ is supplied additionally to the clutch control unit 13. Furthermore, the output rpm $n_{ab}$ is processed by the clutch control unit 13. In dependence upon these input signals, the clutch control unit 13 controls the servo motor 1105 by means of the signal St for displacing the clutch. The engine torque $M_M$ is supplied by the engine control unit 101 to the control unit 13. The engine torque $M_M$ can, however, also be computed in the clutch control unit 13 based on the operating data (for example, load, engine rpm) of the engine. An rpm sensor 102 supplies the engine rpm $n_M$. This signal, like the engine torque $M_M$, is generally present in the motor control apparatus 101 and can be supplied from there to the control unit 13. Furthermore, the sensor 1107 measures the output rpm $n_{ab}$ of the servo clutch.

For the subject matter of the present invention, the function of the servo clutch is only significant insofar that it reduces or interrupts the force-locked engagement between the engine 10 and the wheels 12.

The clutch is equipped with the following in a manner known per se: a fly wheel 1101, a pressure plate 1111, a spring element (plate spring) 1102 and the clutch-release bearing 1112. The torque is transmitted by the clutch in a slipping operation. This torque or clutch torque $M_K$ is given, inter alia, by pretensioning the plate spring 1102. The pretensioning of the plate spring 1102 is, in turn, dependent upon the engaging path S of the clutch linkage which is configured as a gear rack 1104 in this embodiment. The gear rack 1104 is actuated by the output shaft of the positioning motor 1105. In normal operation of the clutch, the path S, that is the engaging path, is controlled via a control loop in dependence upon the desired value $S_{des}$. In this way, the clutch torque can be controlled via the desired value $S_{des}$.

What is essential for the present invention is that the motor control apparatus 101 transmits, inter alia, the signal F to the clutch control apparatus 13 when a fault is detected in the motor control apparatus which leads to an emergency shutoff of the engine (for example, a shutoff of fuel metering). In reaction to the fault signal F, a control St of the clutch is initiated in the clutch control apparatus 13 which leads to a disengagement of the clutch and therefore to an interruption of the force flow between the engine 10 and the wheels 12.

Here, it is again emphasized that the embodiment described above is directed to exemplary illustration of the invention with respect to a servo clutch. The servo clutch serves only as one possibility of the configuration of the means according to the claims by means of which a control signal F (or St) at least reduces the force flow between the vehicle engine and the wheels. Without departing from the concept of the invention, it can be provided that, in lieu of a servo clutch 11, an automatic transmission known per se (with discrete or continuously adjustable transmission ratios), an automatic manual transmission and/or a converter bridge clutch are utilized which can bridge a torque converter downstream of the vehicle engine. It can then be provided that, in the case that the means is configured as an automatic transmission or an automated transmission, the transmission is set into its neutral position in response to the drive signal F. In case of the configuration of the means as a converter bridge clutch, this clutch is at least partially (and especially even completely) disengaged in response to the drive signal F. Combinations of the above-mentioned possibilities can also be utilized in that, for example, an automatic transmission is disengaged in its neutral position and (previously, after or at the same time) the converter bridge clutch is disengaged.

I claim:

1. A system for controlling a device mounted between a motor of a vehicle having wheels and said wheels, said device being adapted to adjust the force flow between said motor and said wheels, the system comprising:

a motor control apparatus for controlling said motor;

means for detecting a fault in said motor control apparatus;

said motor control apparatus being adapted to output a drive signal (F) in dependence upon a fault detected in said motor control apparatus and the detected fault causing a reduction of the torque ($M_M$) of said motor; and, said device being adapted to respond to said drive signal (F) to at least partially reduce said force flow between said motor and said wheels thereby preventing or at least reducing an abrupt torque change at said drive wheels.

2. The system of claim 1, wherein the detected fault causes a change of the torque ($M_M$) of said motor.

3. The system of claim 1, wherein the detected fault causes an abrupt reduction of the torque ($M_M$) of said motor.

4. The system of claim 1, wherein said force flow between said motor and said wheels is interrupted in response to said drive signal (F).

5. The system of claim 1, wherein said device is configured as a clutch mounted downstream of said motor and said clutch is adapted to disengage at least partially in response to said drive signal (F).

6. The system of claim 1, wherein said device is configured as a converter bridge clutch; and, said converter bridge clutch is adapted to at least partially disengaged in response to said drive signal (F).

* * * * *